US012614402B2

(12) United States Patent
Jiao et al.

(10) Patent No.: US 12,614,402 B2
(45) Date of Patent: Apr. 28, 2026

(54) METHOD FOR PERFORMING A SERVICE WITH AN APPLICATION WHEN SCANNING AN OPTICAL TAG

(71) Applicant: Orange, Issy-les-Moulineaux (FR)

(72) Inventors: Shi Jiao, Beijing (CN); Zhihong Guo, Beijing (CN)

(73) Assignee: Orange, Issy-les-Moulineaux (FR)

( * ) Notice: Subject to any disclaimer, the term of this patent is extended or adjusted under 35 U.S.C. 154(b) by 444 days.

(21) Appl. No.: 18/145,613

(22) Filed: Dec. 22, 2022

(65) Prior Publication Data

US 2023/0206663 A1     Jun. 29, 2023

(30) Foreign Application Priority Data

Dec. 23, 2021    (WO) ................ PCT/CN2021/140763

(51) Int. Cl.
*G06V 30/14*               (2022.01)

(52) U.S. Cl.
CPC ................................ *G06V 30/1448* (2022.01)

(58) Field of Classification Search
CPC ....... H04L 63/10; H04L 51/18; G06K 7/1417; G06K 19/06037; G06K 19/06112; G06K 7/1413; G06V 30/224; G06V 10/10; G06V 30/1448
See application file for complete search history.

(56) References Cited

U.S. PATENT DOCUMENTS

| | | | |
|---|---|---|---|
| 2013/0031623 A1* | 1/2013 | Sanders | G06F 21/36 726/19 |
| 2013/0167208 A1* | 6/2013 | Shi | H04L 63/18 726/5 |
| 2013/0173484 A1* | 7/2013 | Wesby | G06K 7/1417 705/318 |
| 2014/0181256 A1* | 6/2014 | Trifa | H04L 67/54 709/218 |
| 2015/0141005 A1* | 5/2015 | Suryavanshi | H04W 12/06 455/434 |
| 2015/0178721 A1* | 6/2015 | Pandiarajan | G06K 19/06112 705/64 |

(Continued)

FOREIGN PATENT DOCUMENTS

| | | | | |
|---|---|---|---|---|
| KR | 20130030863 A * | 3/2013 | | G06V 30/224 |
| WO | WO-2019154168 A1 * | 8/2019 | | G07F 19/201 |

(Continued)

OTHER PUBLICATIONS

International Search Report for International Application No. PCT/CN2021/140763, dated Jun. 15, 2022.

(Continued)

*Primary Examiner* — Dung Hong
(74) *Attorney, Agent, or Firm* — Knobbe, Martens, Olson & Bear, LLP

(57)          ABSTRACT

A method for operating a terminal, where the method includes performing by a processing unit of the terminal: extracting a character sequence from an optical tag scanned with a camera of the terminal, where the character sequence defines a service to be performed by a target application of the terminal; determining that the character sequence matches a target rule associated to the target application; and processing the character sequence so as to trigger the target application to perform the service.

16 Claims, 2 Drawing Sheets

(56) References Cited

U.S. PATENT DOCUMENTS

| | | | |
|---|---|---|---|
| 2016/0142351 A1 | | 5/2016 | Chiu et al. |
| 2017/0316296 A1* | | 11/2017 | Ashiura ........... G06K 19/06028 |
| 2018/0248878 A1* | | 8/2018 | El-Moussa .......... G06F 16/9554 |
| 2021/0192003 A1 | | 6/2021 | Kargaran |
| 2022/0309059 A1* | | 9/2022 | Horvath .............. G06F 16/9554 |
| 2024/0089249 A1* | | 3/2024 | Richardson ......... H04L 63/1475 |

FOREIGN PATENT DOCUMENTS

| | | | | |
|---|---|---|---|---|
| WO | WO-2021223662 A1 * | 11/2021 | ......... | G06F 16/9554 |
| WO | WO-2022022566 A1 * | 2/2022 | ........... | G06K 7/1404 |

OTHER PUBLICATIONS

Written Opinion of the International Searching Authority for International Application No. PCT/CN2021/140763, dated Jun. 2022.

* cited by examiner

METHOD FOR PERFORMING A SERVICE WITH AN APPLICATION WHEN SCANNING AN OPTICAL TAG

CROSS-REFERENCE TO RELATED APPLICATIONS

This application claims foreign priority to International Patent Application No. PCT/CN2021/140763, entitled "METHOD FOR PERFORMING A SERVICE WITH AN APPLICATION WHEN SCANNING AN OPTICAL TAG" and filed Dec. 23, 2021, the content of which is incorporated by reference herein in its entirety.

BACKGROUND

Field

The field of this development is that of mobile terminals.

More particularly, the development relates to a method for performing a service with an application when scanning an optical tag such as a QR code.

Description of the Related Technology

Recent mobile terminals (e.g. smartphones) include cameras and provide functions based on QR codes (or more generally speaking optical tags).

QR codes were initially used to store a URL address, for allowing a user to directly access the corresponding web page.

More recently, many mobile applications directly propose dedicated uses of the QR code. For example, some messaging applications propose to add friends by scanning the QR code displayed by their mobile terminals, some payment applications allow to scan the QR code to pay, etc.

The problem is that these applications are cumbersome to use. When you need to scan a QR code (for instance for triggering a payment), you first have to find the dedicated application that provides services based on this QR code in your phone and launch it, then you have to find the scan button to start the scan function. This action of finding different apps for different QR codes can happen every day, which is really annoying.

Since smartphones nowadays usually provide a generic camera application (which is generally easy to find—sometimes directly on the lock screen), which can recognize a QR code, it would be much more convenient if the QR code could be scanned through the camera application so as to have the service directly provided.

Currently, there are some solutions which perform part of such scenario, in particular Android app link and IOS universal link. Here, the content of the QR code is a URL link (which can be directly accessed in the camera application), and the user is taken directly to the corresponding in-app location.

In this way, when the camera app obtains the QR code content (for example designating the URL link https://domain.name/xxx), it tries to find and launch the application that supports this application link. If such an application is installed in the phone, that application will be launched and navigated to the required page, else the link is open in a browser. The user may also be proposed to download and install the application.

However, this known art solution has some limitations.

First of all, the content of the QR code must be a URL link. This limits the complexity and flexibility of the information provided by the QR code.

Secondly, a JSON verification file has to be located on the server represented by the URL's domain name, to verify that both the app and the website URLs are owned by the same party. And accessing the JSON verification file requires that the mobile phone is connected to the Internet, even if it is not necessary for the triggered service.

There is consequently a need for an improved method for accessing more easily any service with an application when scanning a QR code.

SUMMARY

For these purposes, the present development provides a method for operating a terminal, the method comprising performing by a processing unit of the terminal:

extracting a character sequence from an optical tag scanned with a camera of the terminal, wherein said character sequence defines a service to be performed by a target application of the terminal;

determining that said character sequence matches a target rule associated to the target application; and processing the character sequence so as to trigger said target application to perform said service.

Preferred but non limiting features of the present development are as follow:

the processing step comprises launching said target application and instructing it to perform said service, and the method comprises a further step of performing said service, implemented by the target application;

a camera application for acquiring photos using the camera is installed in the terminal, the extracting, determining and processing steps being implemented by the camera application;

a pair of the target rule and a corresponding target component are associated to the target application, the processing step being performed by said target component;

the target rule and the target component are hosted by said camera application;

the method comprises a previous step of providing to the camera application the target rule and the target component from the target application or from a remote server;

this previous step is performed when said target application is installed or launched for the first time;

this previous step further comprises authorizing the camera application to trigger launching the target application;

this target rule belongs to a set of rules each corresponding to an application installed in the terminal;

this character sequence is a regular expression, the processing step comprising parsing said regular expression.

In a second aspect, the development proposes a mobile terminal comprising a processing unit and a camera, the processing unit being configured to:

extract a character sequence from an optical tag scanned with the camera, wherein said character sequence defines a service to be performed by a target application of the terminal;

determine that said character sequence matches a target rule associated to the target application; and process the character sequence so as to trigger said target application to perform said service.

According to a third and a fourth aspects, the development provides a computer program product, comprising code instructions for executing a method according to the first aspect for operating a terminal; and a computer-readable medium, on which is stored a computer program product comprising code instructions for executing a method according to the first aspect for operating a terminal.

BRIEF DESCRIPTION OF THE DRAWINGS

The above and other objects, features and advantages of this development will be apparent in the following detailed description of an illustrative embodiment thereof, which is to be read in connection with the accompanying drawings wherein.

DETAILED DESCRIPTION OF CERTAIN ILLUSTRATIVE EMBODIMENTS

Architecture

Figure 1:
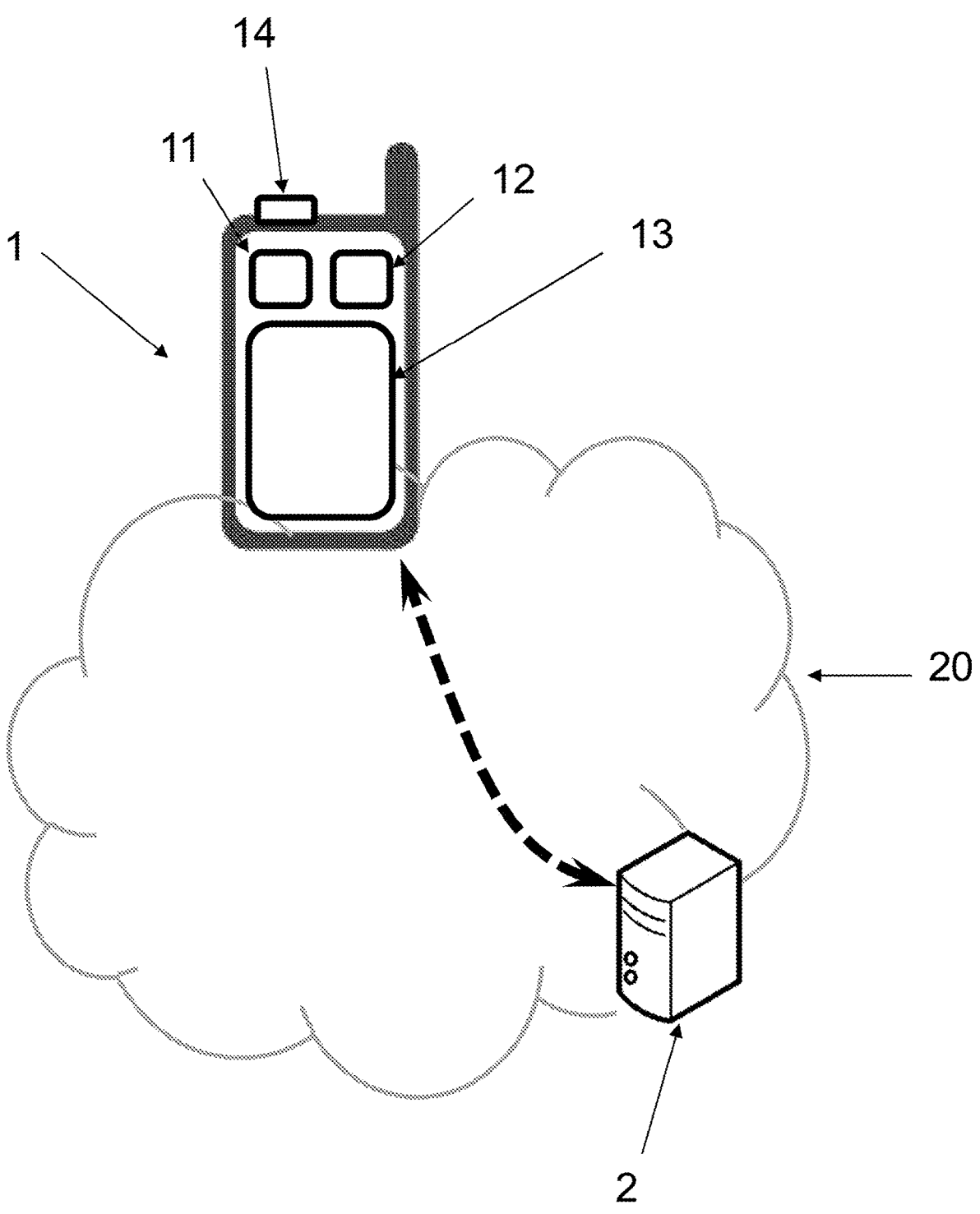
FIG. 1 illustrates an example of architecture in which the method according to the development is performed.

The present development relates to a method for operating a mobile terminal 1 as represented by FIG. 1. More precisely, the present method is for performing a service by a target application of a terminal 1 when scanning an optical tag (which may alternatively be referred to as an optical label) such as a QR code. This optical tag may in particular any kind of (bar)code which may be optically scanned by a camera and which is able to represent information, in order to read a character sequence it contains, in particular a matrix code such as a QR code, a Data Matrix or a PDF417, but also a high-capacity color barcode, a circular barcode, etc.

Here, by "service", it is meant any function that can be technically performed using the application, in a very broad sense. In the following description, a TV application will be chosen as the target application, and as an example the service "display a given channel on said TV application", but the service could be for instance a payment via a banking app, ad ding a friend to a social application, etc. As it will be shown, the present method is very flexible, and any possible use of an application of the terminal 1 can be provided through an optical tag such as a QR code.

The mobile terminal 1 is a device comprising a processing unit 11, i.e. a CPU (one or more processors), a memory 12 (for example flash memory), a screen 13 (preferably touch sensitive) for user interface, and a camera 14. The memory 12 is in particular for storing applications, which can be of various types, and data. The terminal 1 also typically comprises a battery, in particular a rechargeable battery (for instance lithium polymer), for powering the processing unit 11 and other units.

The terminal 1 may further comprise other units such as a location unit for providing location data representative of the position of the terminal 1 (using for example GPS, network triangulation, etc.), a communication unit for connecting (in particular wirelessly) the terminal 1 to a network 20 (for example WiFi, Bluetooth, and preferably a mobile network, in particular a GSM, UMTS, LTE or 5G network, see below), etc.

Indeed, the terminal 1 is typically a smartphone, a tablet computer, a laptop, etc. In the following description the specific example of a smartphone scanning a QR code will be used, solely for illustrative purpose.

Method

Figure 2:
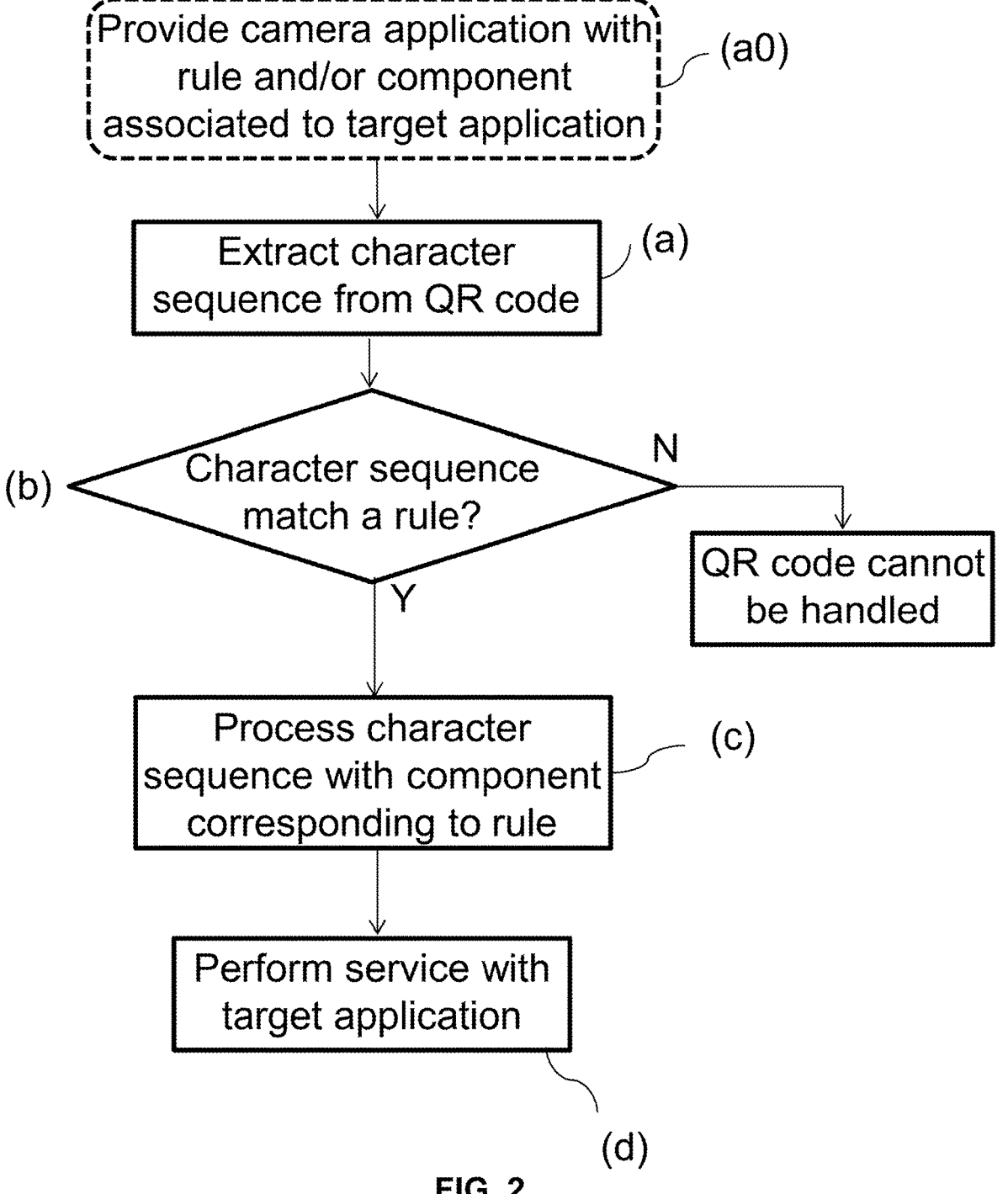
FIG. 2 illustrates a preferred embodiment of a method according to the present development.

Referring to FIG. 2, the present method is performed by the processing unit 11 of the terminal 1, and is mostly implemented by a camera application of the terminal 1. Said application is for acquiring photos using the camera 14, and is generally pre-installed on the terminal 1 or part of the operating system.

The method starts by a step (a) of extracting a character sequence (i.e. a string content) from the optical tag scanned with the camera 14, typically implemented by the camera application. We remind that this optical tag may in particular any kind of (bar)code which may be optically scanned by a camera, in order to read a character sequence it contains, in particular a matrix code such as QR code.

In a known fashion, in step (a) the user places the optical tag (in particular a QR code thus) in front of the camera 14 and launches the camera application, and the camera application automatically recognizes that this is an optical tag, scan it and extracts the character sequence by decoding it. Note that it is possible but not compulsory to actually acquire a photo of the optical tag: the camera application is generally pre-configured to directly extract the content of any optical tag as soon as it is visible by the camera 14 is recognized. Note that a view of the QR code may appear in the screen 13 of the terminal 1, possibly with a button proposing to the user to trigger the next steps of the method.

Said character sequence defines the service to be performed by the target application. By contrast with known QR codes wherein it is typically a URL, here it is preferably a regular expression, i.e. a sequence of characters that specifies in a search pattern.

For instance, the character sequence may be "OrangeTV-action:open;type:channel;channedId:xxxxx-end" in the example of the target application OrangeTV. It defines the service "Play the channel having the Id xxxxx".

As such, the character sequence is not understandable by the camera application, but only by the target application: the syntax of such an expression is not standard and the target application is not known.

Note that the character sequence may be complicated or encrypted.

Then, in a further step (b), the present method astutely proposes to determine that said character sequence matches a target rule associated to the target application. More precisely, there may be a set of rules, each associated to an application of the terminal 1, and step (b) thus comprises comparing the character sequence with each rule in order to determine the rule that matches the character sequence (if there is one), this matching rule being designated as the "target rule".

In our example, a rule may be "^ *OrangeTV.*end *$" (this rule requires that the character sequence must start with "OrangeTV" and end with "end"). Using the previously introduced example, one can see that the character sequence "OrangeTV-action:open;type:channel;channedId:xxxxx-end" matches said rule, hence this rule is a target rule.

As each rule is associated to an application, determining the target rule implies determining the target application.

The camera application is advantageously able to also implement step (b), in particular by having the rule(s) hosted by the camera application, i.e. stored in a memory which is dedicated to the camera application.

Note that, if no matching rule is determined, which could occur if the target application is not installed on the terminal 1, the camera application can inform the user that the optical tag cannot be handled.

In a following step (c), when it is determined that the character sequence matches a target rule associated with a target application, the character sequence is processed so as to trigger this target application to perform the required service, in particular by launching the target application and instructing it to perform the required service.

If the character sequence is a regular expression, it can simply be parsed to determine the service's attributes.

In the previously introduced example, are extracted:
the action "open"
the type "channel"
the channedId "xxxxx".

In a final step (d), the target application performs the service in accordance: the "Orange TV" application plays the channel "xxxxx" for the user.

While step (d) is naturally implemented by the target application, step (c) may be advantageously implemented by the camera application.

To this end, for a given application, the target rule can be associated to a corresponding target component, i.e. a pair consisting of the target rule and the corresponding target component are associated to the target application, the component being also hosted by the camera application.

More generically, a set of pairs of a rule and a component, each pair associated to an application of the terminal 1, may be advantageously hosted by the camera application, i.e. stored in a memory dedicated to this camera application.

A component is a piece of software code in an application that can perform some tasks, and the target component preferably performs step (c). Like the rules, the components can be implemented by the camera application. Alternatively, the rules and/or components could be stored in a remote server 2, but such an embodiment requires then the terminal 1 to be connected to internet (while the method could be fully performed offline is steps (a) to (c) are implemented by the camera application) itself.

The component aims at providing the logic for processing the character sequence, so as to find the service to be performed. In other words, the component parses the regular expression according to its own rules. Thanks to the determination of the target rule, the appropriate target component can be selected to process the character sequence with the right syntax.

To rephrase again, in a case of a plurality of pairs of a rule and a component, step (c) is performed by the component belonging to the same pair as the rule determined as matching said character sequence at step (c).

To this end, step (b) typically comprises sending the extracted character sequence to the components associated to the target rule determined.

When the character sequence has been processed, the target component is able to launch the target application and request it to be executed in the way to perform the requested service. In our example, the component launches the "OrangeTV" application and requests it to open the channel playback page and to select the channel with the Id "xxxxx", which causes the application to perform the expected service "Play the channel xxxxx". Since the target application could already be running in background, "launching" here may mean placing the application in foreground.

Note that the components could be optional if a standard syntax of the character sequences is defined (the camera application would be able to generically process the character sequences and then launch the target application associated to the determined target rule).

Initial Phase

The present method advantageously starts by an optional previous "enrolment" step (a0) of the target application, for allowing automatically performing a service with this target application when scanning an optical tag such as a QR code. This step (a0) has only to be performed once, but it can be repeated, for instance after an update of the target application if this update gives new functionalities to the target application (and hence extends the services that could be performed).

Note that some applications could be "pre-enrolled" (for example applications pre-installed on the terminal).

Step (a0) is a step of providing to the camera application the target rule (and preferably the target component) from the target application or from a remote server 2.

Step (a0) is preferably performed when said target application is installed or launched for the first time (which includes re-installing the application after an update).

Note that step (a0) preferably further comprises authorizing the camera application to trigger launching the target application.

Indeed, every application has generally a manifest file, which claims the software and hardware requirements (also called "permissions") for the phone. For example, if an application needs location information, it will require the permission to access the GPS of the phone in the manifest file. The permissions request will be reviewed by a user during the application installation and can be authorized by the user.

In the present development, when the target application needs to apply a permission (for example, "permission.IN-VOKED_BY_CAMERA", which means that the application claims it can be launched by the camera application) in its manifest file, the rule and/or the component information may advantageously added in the manifest file.

Indeed, defining a permission for such a feature (i.e. an application can be invoked by the camera application with some parameters) will make it transparent to user when an application (such as "OrangeTV") tries to use this feature:

If "permission(INVOKED_BY_CAMERA)" is required in the implementation, and "OrangeTV" application applies to use this permission, then it will be presented to the end user (saying "OrangeTV" requires the permission "INVOKED_BY_CAMERA") when the user tries to install "OrangeTV" on their mobile phone.

If permission is not mandatory in the implementation, the camera can still launch "OrangeTV", but the user will not have such information saying that "OrangeTV use the INVOKED_BY_CAMERA permission" when they install OrangeTV.

When the operating system (or an installer of said operating system) installs an application, the installer preferably shows the user all of the permissions requested by the application, and the user is requested to allow the permission INVOKED_BY_CAMERA (including a description of this permission) in the permission request list. If the user agrees to authorize this permission, the operating system will read the rule and component information from the application manifest file and transmit them to the camera application, so as to store them.

Complete Example

1. A user installs the Orange TV application on the terminal 1.
2. The camera application receives the following info from the "Orange TV" application:
   rule for "Orange TV application": "^ *OrangeTV. *end *$";

corresponding component for "Orange TV" application.

3. Later, this user uses the camera application to scan a QR code.

4. The camera application extracts the following character sequence from the QR code:

"OrangeTV-action:open;type:channel;channedId:xxxxx-end" (the structure is completely defined by the Orange TV team).

5. The camera application compares this extracted character sequence with all saved rules it has received from different applications.

In our example, this character sequence matches the rule provided by "Orange TV" application. As a consequence, the camera application sends the extracted character sequence to the component which corresponds to this rule.

6. The component receives the character sequence, it parses it according to its own logic.

7. The component triggers launching the "Orange TV" application to open the channel playback page, in order to play channel "xxxxx" for the user.

In order to illustrate what is a component in the sense of the present development, the following program instructions (in "Kotlin" Android development language, but any other application development language, for instance Java, could alternatively be used) are given as an example of component(s) usable in the previously introduced use case, referred to as "ChannelActivity" component:

1. The "ChannelActivity" component information can be sent to the Camera application at the time of the first launch of "Orange TV" with the following code:

```
with(ContentValues( )) {
put("PACKAGE_NAME","com.orange.tv")—①
put("COMPONENT_NAME","com.orange.tv.
    ChannelActivity")—②
put("QR_CODE_RULE","^ *OrangeTV.*end *$")—③
contentResolver.insert(getCameraContentUri( ), this)
}
```

①, ② Send ChannelActivity component information to the camera application, the camera application can use them to launch the ChannelActivity component.

③ Send the corresponding rule to the camera application.

2. "ChannelActivity component code is as follows:

```
class ChannelActivity: AppCompatActivity( ) {
override fun onCreate(savedInstanceState:Bundle?) {
super.onCreate(savedInstanceState)
setContentView(R.layout.activity_channel)
val grCode=getQrCode(intent)—①
val channel=queryChannel(grCode)—②
playChannel(channel)—③
    }
}
```

① Get the QR code content from the intent

② Query the corresponding channel through the content of the QR code

③ Play the channel

3. The declaration code of "ChannelActivity" component in AndroidManifest.xml file of "Orange TV" app is:

```
<activity android:name=".ChannelActivity" android:
    exported="true"/>
```

Terminal and Computer Program

The present development also proposes a mobile terminal 1 comprising a processing unit 11 and advantageously a camera 14 for performing the aforementioned method. This terminal 1 may also comprise a memory 12.

The aforementioned processing unit 11 is in particular configured to implement the steps of:

extract a character sequence from an optical tag scanned with the camera 14, wherein said character sequence defines a service to be performed by a target application of the terminal 1;

determine that said character sequence matches a target rule associated to the target application; and process the character sequence so as to trigger said target application to perform said service.

As explained, these steps are preferably implemented by a camera application of the terminal 1, while the service is eventually performed by the target application.

The development further proposes a computer program product, comprising code instructions for executing (in particular with a processing unit 11 of the terminal 1) the previously described method, as well as a computer-readable medium (in particular a memory 12 of the terminal 1), on which is stored a computer program product comprising code instructions for executing said method. In particular, this computer program product may correspond to the operating system of the terminal 1, and/or a messaging application.

Although the development has been previously described with reference to certain specific embodiments, it is to be understood that various modifications and improvements can be made without departing from the scope of the development as defined in the appended claims.

The invention claimed is:

1. A method for operating a terminal, the method comprising performing by a processing unit of the terminal:

extracting a character sequence from an optical tag scanned with a camera of the terminal, wherein the character sequence defines a service to be performed by a target application of the terminal, the target application being associated with a pair of a target rule and a corresponding target component;

determining that the character sequence matches, among a plurality of pairs of a target rule and a target component associated with a target application, a target rule associated to the target application for performing the service; and the target component processing the character sequence with a target component belonging to the same pair as the target rule determined as matching the character sequence, so as to trigger the target application to perform the service.

2. The method according to claim 1, wherein the processing comprises launching the target application and instructing it to perform the service, and the method comprises a further performing the service, implemented by the target application.

3. The method according to claim 1, wherein a camera application for acquiring photos using the camera is installed in the terminal, the extracting, determining and processing being implemented by the camera application.

4. The method according to claim 1, wherein a camera application for acquiring photos using the camera is installed in the terminal, the extracting, determining and processing being implemented by the camera application, and wherein the pair of the target rule and of the target component associated with the target application are hosted by the camera application.

5. The method according to claim 4, comprising providing to the camera application the pair of the target rule and the target component from the target application or from a remote server.

6. The method according to claim 5, wherein the providing is performed when the target application is installed or launched for the first time.

7. The method according to claim 5, wherein the providing further comprises authorizing the camera application to trigger launching the target application.

8. The method according to claim 1, wherein the target rule belongs to a set of rules each corresponding to an application installed in the terminal.

9. The method according to claim 1, wherein the character sequence is a regular expression, the processing comprising parsing the regular expression.

10. The terminal comprising a processor and a memory, the memory storing program code instructions of a computer program for executing the method according to claim 1 for operating the terminal, when the computer program is executed by the processor of the terminal.

11. A non-transitory computer-readable medium, on which is stored a computer program comprising code instructions for executing the method according to claim 1 for operating the terminal.

12. A mobile terminal comprising a processing unit and a camera, the processing unit being configured to:

extract a character sequence from an optical tag scanned with the camera, wherein the character sequence defines a service to be performed by a target application of the terminal, the target application being associated with a pair of a target rule and a corresponding target component;

determine that the character sequence matches, among a plurality of pairs of a target rule and a target component associated with a target application, a target rule associated to the target application for performing the service; and have the target component processing the character sequence with a target component belonging to the same pair as the target rule determined as matching the character sequence, so as to trigger the target application to perform the service.

13. The mobile terminal according to claim 12, wherein a camera application for acquiring photos using the camera is installed in the terminal, the extracting, determining and processing being implemented by the camera application, and wherein the pair of the target rule and of the target component associated with the target application are hosted by the camera application.

14. The mobile terminal according to claim 13, being further adapted to provide to the camera application the pair of the target rule and the target component from the target application or from a remote server.

15. A method for operating a terminal, the method comprising performing by a processing unit of the terminal:

extracting a character sequence from an optical tag scanned with a camera of the terminal, wherein the character sequence defines a service to be performed by a target application of the terminal, the target application being associated with a pair of a target rule and a corresponding target component;

determining that the character sequence matches a target rule associated to the target application; and the target component processing the character sequence so as to trigger the target application to perform the service, wherein a camera application for acquiring photos using the camera is installed in the terminal, the extracting, determining and processing being implemented by the camera application, and wherein the target rule and the target component are hosted by the camera application, and wherein the method further comprises providing to the camera application the target rule and the target component from the target application or from a remote server, the providing further comprises authorizing the camera application to trigger launching the target application.

16. A mobile terminal comprising a processing unit and a camera, the processing unit being configured to:

extract a character sequence from an optical tag scanned with the camera, wherein the character sequence defines a service to be performed by a target application of the terminal, the target application being associated with a pair of a target rule and a corresponding target component;

determine that the character sequence matches a target rule associated to the target application; and have the target component processing the character sequence so as to trigger the target application to perform the service, wherein a camera application for acquiring photos using the camera is installed in the terminal, the extracting, determining and processing being implemented by the camera application, and wherein the target rule and the target component are hosted by the camera application, and wherein the processing unit is further configured to provide to the camera application the target rule and the target component from the target application or from a remote server, the providing further comprises authorizing the camera application to trigger launching the target application.

* * * * *